United States Patent [19]
Martin et al.

[11] Patent Number: 5,826,400
[45] Date of Patent: Oct. 27, 1998

[54] PLASTIC BOTTLE ROTATION RESTRAINT FOR CAPPING MACHINE

[75] Inventors: Robert A. Martin; Wendell S. Martin, both of Fort Smith, Ark.

[73] Assignee: Anderson-Martin Machine Company, Fort Smith, Ark.

[21] Appl. No.: 917,786

[22] Filed: Aug. 20, 1997

Related U.S. Application Data

[60] Provisional application No. 60/025,011, Aug. 21, 1996.
[51] Int. Cl.$^6$ ..................................................... B65B 7/14
[52] U.S. Cl. ............................... 53/367; 53/317; 53/331.5
[58] Field of Search ................................... 53/331.5, 317, 53/367, 490, 381.4, 308

[56] References Cited

U.S. PATENT DOCUMENTS

| | | |
|---|---|---|
| 1,279,413 | 9/1918 | Norton . |
| 3,576,247 | 4/1971 | Caulford et al. .......................... 198/33 |
| 3,771,284 | 11/1973 | Boeckmann et al. ..................... 53/282 |
| 3,812,646 | 5/1974 | Baldyga ..................................... 53/329 |
| 3,831,344 | 8/1974 | Over .......................................... 53/329 |
| 4,120,133 | 10/1978 | Rogers et al. ............................. 52/745 |
| 4,120,135 | 10/1978 | Baldyga ..................................... 53/473 |
| 4,143,754 | 3/1979 | Eldred ...................................... 198/379 |
| 4,266,456 | 5/1981 | Oostvogels ................................ 83/731 |
| 4,295,320 | 10/1981 | Willingham ............................... 53/201 |
| 4,658,565 | 4/1987 | Westbrook et al. ....................... 53/308 |
| 4,765,119 | 8/1988 | Aidlin et al. .............................. 53/308 |
| 4,939,890 | 7/1990 | Peronek et al. . |
| 4,959,190 | 9/1990 | Pfeiffer et al. .......................... 264/516 |
| 5,160,019 | 11/1992 | Temming ............................. 198/803.9 |
| 5,224,586 | 7/1993 | Naka et al. ......................... 198/803.11 |
| 5,398,485 | 3/1995 | Osifchin .................................... 53/490 |

FOREIGN PATENT DOCUMENTS 492452  9/1938  United Kingdom .................. 53/331.5

Primary Examiner—Daniel Moon
Assistant Examiner—James P. Calve
Attorney, Agent, or Firm—Robert R. Keegan; Head, Johnson & Kachigian

[57] ABSTRACT

There is disclosed apparatus for incorporation in conventional bottle capping or bottle filling and capping machines to improve the handling of plastic bottles with pre-threaded screw caps and with a three dimensional bottom surface commonly employed and referred to as a petaloid shape. The normal flat table surface on which bottles rest while the cap is being screwed on is replaced with a surface having upstanding, radially-arranged fingers positioned to extend into all or most of the spaces between the lobes in the bottom of the petaloid bottle at each bottle capping station and form a nest for such bottles. Generally conventional bottle receiver and guide elements cause the bottles to assume a position substantially upright and coaxial with the center of the array of fingers for the particular bottle capping station. One embodiment of the apparatus includes a depression in the table surface to receive the bottom of a petaloid bottle and the fingers are located in that depression. Other embodiments of the apparatus have a generally flat surface except for the upstanding fingers. Most embodiments of the apparatus have no moving parts as such, but one embodiment has depressible, spring-loaded fingers to facilitate entrance and exit of the bottom of the bottle from the nest of fingers. The apparatus serves to prevent rotation of bottles as the screw caps are tightened without knives or pins engaging the top of the bottle as heretofore commonly employed.

16 Claims, 5 Drawing Sheets

PLASTIC BOTTLE ROTATION RESTRAINT FOR CAPPING MACHINE

This application claims benefit of USC provisional appln. No. 60/025,011, filed Aug. 21, 1996.

BACKGROUND OF THE INVENTION

1. Field of the Invention

The present invention relates to improvements in bottle capping machines or bottle filling and capping machines to improve the efficiency and reliability of handling plastic bottles which have become a very common container for beverages and, to some extent, other liquids. More particularly, the invention relates to improvements particularly suited for plastic bottles with pre-threaded screw caps and with a three dimensional bottom surface of, what might be termed, a radially symmetric flower-shape. This common and nearly universal shape for plastic bottles will be referred to herein as a petaloid shape, or simply petaloid.

In processing these screw cap threaded petaloid containers through a known type of filling and/or capping machine (such as shown, for example, in U.S. Pat. No. 4,295,320 or U.S. Pat. No. 4,658,565), it has been found to be necessary to prevent the rotating capping head that applies the screw cap from also rapidly rotating the bottle; such rotation of the bottle can have a very deleterious effect on the operation of the machine as the bottles pass through at a high rate of speed, often 100 bottles per minute or more. Various expedients have been employed to prevent rotation of the bottle as the screw cap is rotated on the threaded bottle neck and firmly seated with a desired torque. A very common expedient has been to provide knife elements or pin elements which penetrate the upper portion of the plastic bottle, as at the peripheral lip immediately below the cap position. While the reliability of such a technique is less than desirable and has the disadvantage that it inevitably leaves a mark on the bottle, it has been accepted in the industry. The main drawing of prior art U.S. Pat. No. 4,295,320 is reproduced herein as FIG. 7 and the disclosure of U.S. Pat. No. 4,658,565 is in relevant part incorporated by reference.

SUMMARY OF THE INVENTION

According to the present invention, a rotation restraint for screw cap, petaloid shape bottles is provided which overcomes the above-mentioned drawbacks and other disadvantages of the prior devices by utilizing the non-flat, petaloid bottom shape of the now popular plastic bottle as a means of providing sufficient engagement between the table on which the bottle rests in the capping machine and the bottle itself to prevent significant rotation of the bottle by the rotating capping head while the capping head screws the cap on the bottle and seats the cap with a predetermined torque, generally determined by a slip clutch in the capping head. Contrary to what might be expected, the petaloid conforming gripping means utilized according to the present invention does not significantly interfere with entry of the bottles onto the capping machine table nor with their exit therefrom.

Although it has been known to provide a recess in the table of a capping machine to receive the base of a bottle (as in U.S. Pat. No. 3,831,344) such arrangements were neither intended to or capable of restraining the bottle against rotation as a screw cap was applied.

It is an object of the present invention to provide an apparatus and method for restraining plastic bottles having a petaloid shape in a capping machine of conventional configuration which eliminates the necessity for penetration of the bottle by knives or pins, but rather by gripping the bottom surface of the bottle with a petaloid-matching configuration of fingers that accommodate the entry and exit of the bottle from the station at which the gripping mechanism is located.

It is another object of the present invention to provide an improvement for capping machines adapted for capping plastic bottles of petaloid shape with screw caps applied by rotating capping heads to provide restraint for rotation of the bottle without any intrusive knives or pins employed for grasping the bottle and employing instead suitable engagement means for the petaloid bottom of the bottle.

BRIEF DESCRIPTION OF THE DRAWINGS

Other objects and advantages of the present invention will be readily apparent to those skilled in the art from consideration of the following detailed description taken in conjunction with the appended drawings in which.

DETAILED DESCRIPTION OF THE PREFERRED EMBODIMENTS

Figure 1:
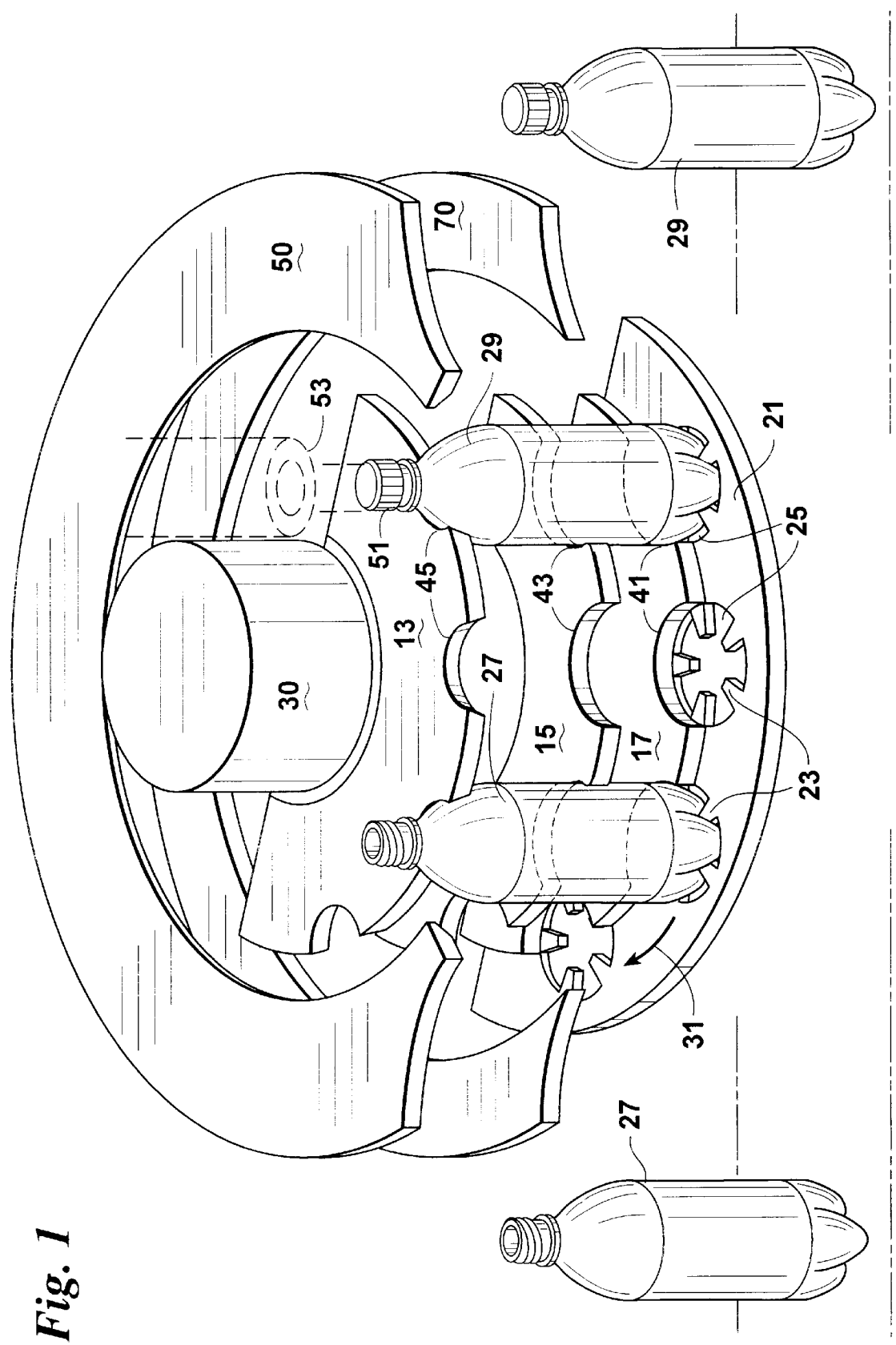
FIG. 1 is a perspective, partially schematic, view of plastic bottle rotation restraint apparatus according to the invention together with a portion of a typical capping machine environment with which it interacts.
Figure 7:
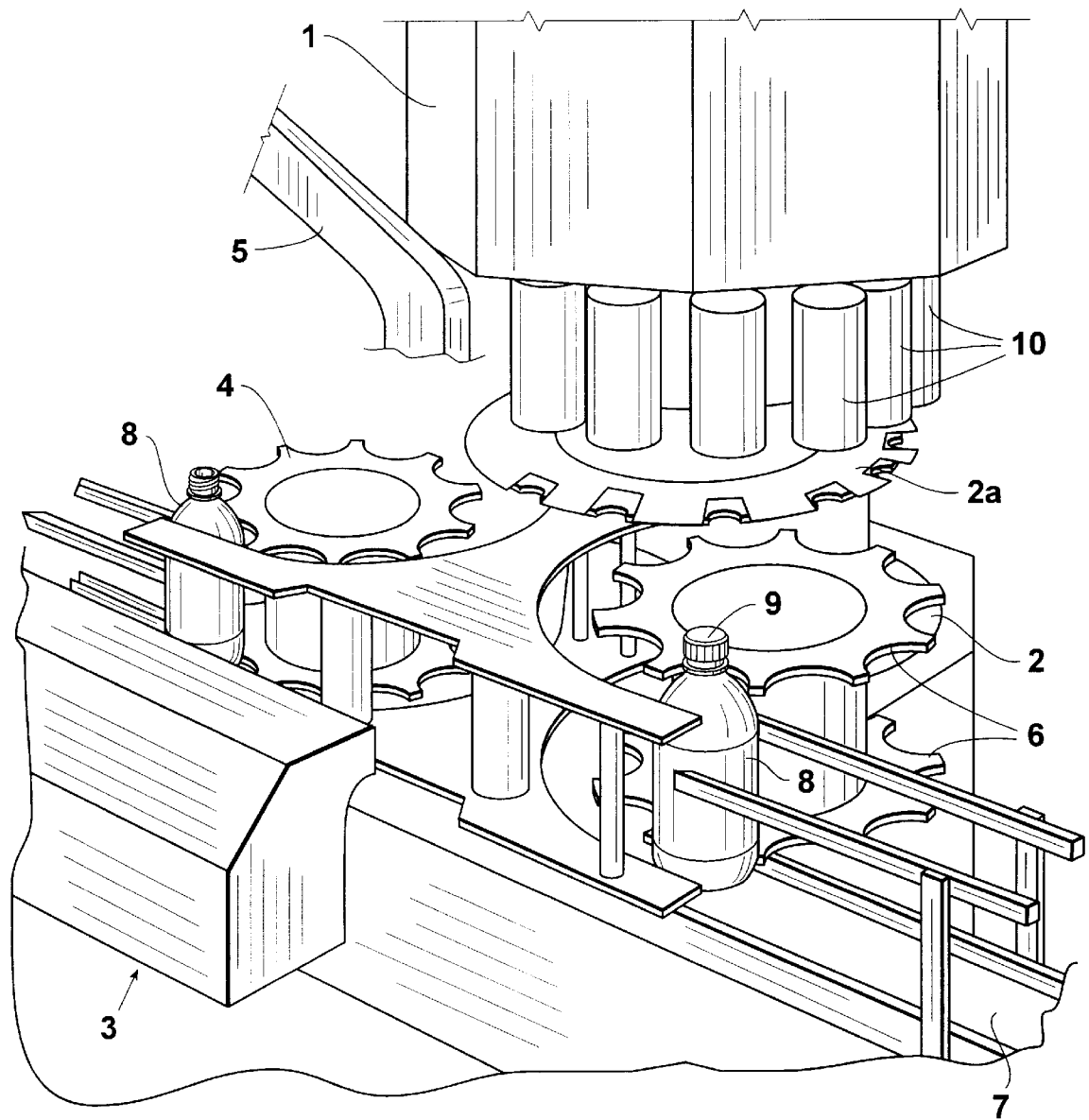
FIG. 7 shows a capping machine and associated conveyors of the prior art as an example of apparatus adaptable to incorporate the present invention.

Referring to FIG. 1 and FIG. 7 (illustrating prior art) it will be noted that bottle capping machine environment is shown representing a typical bottling machine employed for capping (or filling and capping) petaloid plastic bottles. However, knife apparatus for engaging the cap ring on the neck of the bottle to prevent rotation (as in U.S. Pat. No. 4,658,565) is not shown. Such previously known apparatus should in any event be disabled or removed from the apparatus in order to employ Applicants' invention.

The advantages of removing or disabling the apparatus employing bottle-piercing knives which catch and engage the bottle under the neck ring can better be understood by a brief description of such apparatus and its function.

A substantial amount of downward pressure on the top of the bottle, e.g. 20–50 pounds, is necessary to force the underneath side of the bottle neck ring into the pins or knives to prevent rotation of the bottle. This downward force must be induced through the closure threads to the bottle threads, and this method has two detrimental effects. First, the friction resulting from the thread to thread contact creates a variance in the application torque. The application torque being the summation of the sealing friction and thread friction. Secondly, the knives can create a sharp burr on the edge of the neck ring because of their necessary indentation in the plastic. If the knife edges are not in excellent condition, they will peel the plastic from underneath the neck ring which results in the accumulation of undesirable shavings around the area of the capping operation. Often the knife edges will produce a sharp bur under the neck ring which can cause injury to the consumer of the product when the closure is removed. Even a slight injury which breaks the skin of the consumer is of potential concern.

Figure 2:
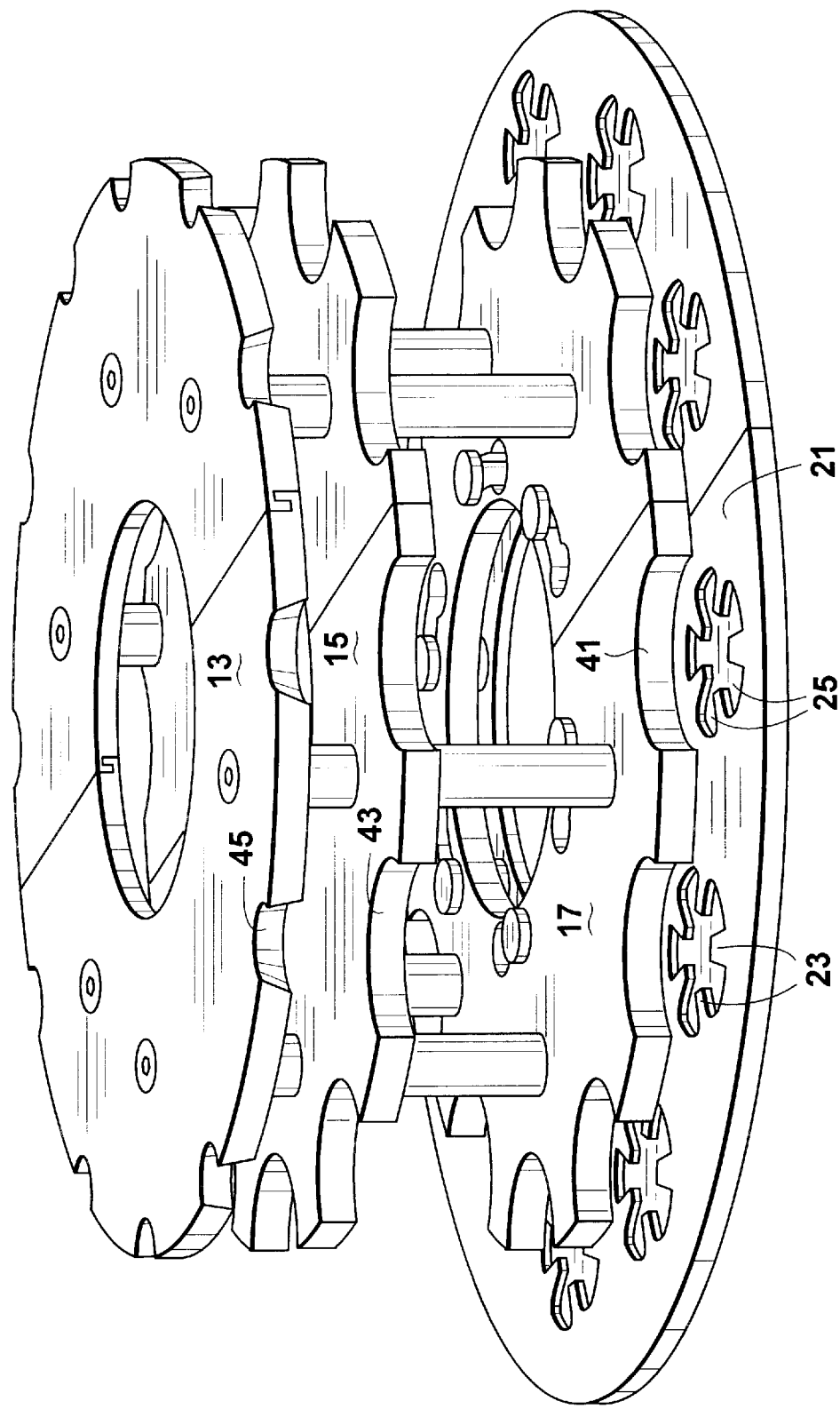
FIG. 2 is a perspective view of an embodiment of the invention with twelve petaloid-gripping nests similar to FIG. 1.

As will be seen from the following description, the rotation restraint system of the present invention eliminates the above disadvantages and is simple and usable on virtually all plastic bottles which have petaloid bases, whether they have five petals or lobes as is most common or a greater or lesser number. As seen in FIGS. 1 and 2, a major feature of the invention is the provision of a plurality of sets of fingers in a petaloid configuration, and which, in the apparatus of FIG. 1, are arranged in a nest residing below the primary surface of table 21 and configured to accept the bottom of the particular size and shape of petaloid bottle being processed. Sizes may range from less than a quart to more than two quarts.

It should be noted that as to most of the elements and parts of a capping machine (excluding the previous form of bottle anti-rotation device) their function and, in most cases, their structure will not be changed. Elements retaining their usual function include rotating center unit 30, upper stationary guide 50, lower stationary guide 70, upper rotating receiver 13, and mid-level rotating receiver 15. It will be appreciated that the particular configuration of these elements will change if, and when, there is any significant change in the size or shape of the bottle being processed. When the bottle rotation restraint apparatus and method of the invention is employed, slight variations in the rotating receivers 13, 15, and 17 may be made to achieve optimum performance; for example, upper rotatable receiver 13 needs to properly receive a bottle before it drops into nest 25 and also aid in positioning the bottle after it becomes aligned rotationally with fingers 23 and drops into nest 25. In FIG. 1 of the application, in order to better show important features of the invention, apparatus required to transport bottles to and convey bottles away from table 21 has been omitted. Also much of the capping and/or filling structure and the cap supply means has been omitted. Typical apparatus corresponding to that omitted from FIG. 1 of the application is shown in FIG. 7 (reproduced from U.S. Pat. No. 4,295,320 and described and explained therein).

Although capping machines are known in which the table, such as table 21, turns in a counterclockwise direction, table 21 in FIG. 1 and the other rotating elements moving therewith turn in a clockwise or leftward direction as indicated by arrow 31.

Each bottle, such as bottle 27, is first positioned by a star wheel or other conveyor mechanism and received in recess 41 of rotating receiver 17 and is guided and maintained in vertical position by recesses 43 and 45. Since it is not assured that the petaloid lobes on the bottom of the bottle do not align with the fingers 23, this may occur and the bottle will in that case be supported above the nest 25 by fingers 23. However, as long as the bottle is positioned coaxially with nest 25 and retained as by recesses 41, 43, and 45 vertically and coaxially aligned with the axis of the capping head, it is not required that the bottle 27 be seated in nest 25 until the bottle cap is rotated nearly to its final position.

In FIG. 1 bottle 29 is shown at or near the exit position from table 21 and cap 51 would be seated on bottle 29 with a torque determined by the slip clutch of a capping head, the position of which is shown in dashed lines at 53. At this time, bottle 29 is seated in nest 25 with fingers 23 inserted between the petaloid lobes of bottle 29. Due to the normal force downward on bottle 29, the engagement of bottle 29 by fingers 23 is more than sufficiently firm to resist any torque applied to the bottle through cap 51 thereby assuring that bottle 29 does not rotate under the influence of the rotating capping head, which rotation could cause an incomplete seal of the cap 51 on bottle 29 due to inadequate torque being applied.

From the foregoing description it will be apparent that even if bottle 29 should have been oriented to remain atop fingers 23, once cap 51 was rotated by the capping head and, particularly once it began to seat on bottle 29, a few degrees of rotation of bottle 29 would cause the petaloid lobes of the bottom of the bottle to fall between fingers 23 and cause the bottle to become seated in nest 25 restrained from further rotation by the capping head.

As will be seen from FIG. 1 and from FIG. 7, bottles exit from the capping machine by virtue of an exit star wheel or other means receiving the bottles from the rotating table, such as table 21, and delivering them to a conveyor, in a manner which is generally the reverse of their mode of entry (e.g. by an entry star wheel operation which delivers from conveyor to rotating table). In the apparatus of the present invention as shown in FIGS. 1 and 2 the bottles must be raised out of the nest 25 only on exit from the capping machine. While some mechanism could be provided such as a plunger rising from the center of the nest to lift the bottle, it has been found unnecessary in the ordinary case to provide any mechanism other than the normally present star wheel to effectuate the exit of the bottle by moving it off of the table 21; in the course of exiting it is raised sufficiently to clear the walls of nest 25 and the fingers 23. The ease with which the bottles are removed without complicated lifting mechanisms is believed due to the rounded or bulbous shape of the petals on the petaloid bottom of the bottle serving to ramp the bottle out of the nest 25.

To aid in understanding the manner in which the improvement according to the present invention is incorporated into a conventional capping or filling and capping machine, one may refer to FIG. 7 showing a prior art machine and the following brief description of its operation and structure. The capping machine of FIG. 7 comprises a rotating turret 1 moving with rotating bottle table 2. One or more receivers 2a (sometimes referred to as star wheels) are located above table 2 and rotate with table 2 to provide lateral support for the upper portions of the bottles as they move in a circular path under the influence of the rotary bottle table 2. Guide rails (not shown) may serve to hold the bottles in the pockets of the rotating receivers 2a.

Bottles 8, in this case having been prefilled with liquid product, are supplied to the rotary table 2 by a conventional infeed 3 typically in the form of a worm infeed, together with a star wheel transfer 4. As each bottle 8 enters the rotary table 2, an internally threaded plastic cap is loosely deposited on the neck of the bottle by conventional cap feeding mechanism 5. Caps 9 are successively engaged by rotating applicating heads 10 and apply to the threaded neck of the bottle 8 as the bottles are moved around the periphery of the rotary table 2. The capped bottles are removed from the rotary table 2 by conventional star wheel 6 and deposited on a moving conveyor 7 which conveys them to further packaging apparatus.

It will be noted that the apparatus of FIG. 7 representative of prior art has no means for restraining bottles 8 from rotation under the influence of applicating heads 10. The improvement provided by Applicant's invention performs this function by providing a table surface of the form of table 21 in FIGS. 1 and 2, for example, in place of the flat table surface 2 shown in FIG. 7 typical of the prior art.

While one could alter the shape of the nest 25 and/or the fingers 23 in the exit direction for the bottle 29 (even omitting one or two fingers) so that the bottle would lift more gradually out of the nest 25 under the action of an exit star wheel, it has been found unnecessary to do so with petaloid bottles of ordinary shape. If it were necessary to work with petaloid bottles of unusual shape, or if the normal petaloid shape was changed at some future time, then providing some such ramp configuration for the nest 25 and/or fingers 23 on the exit side might prove to be desirable. Also some lifting mechanism such as a plunger rising from the bottom of the well could then be employed (it may be noted that U.S. Pat. No. 3,831,344, issued Aug. 27, 1974 to David J. Oger disclosed such a plunger or pedestal).

Figure 6:
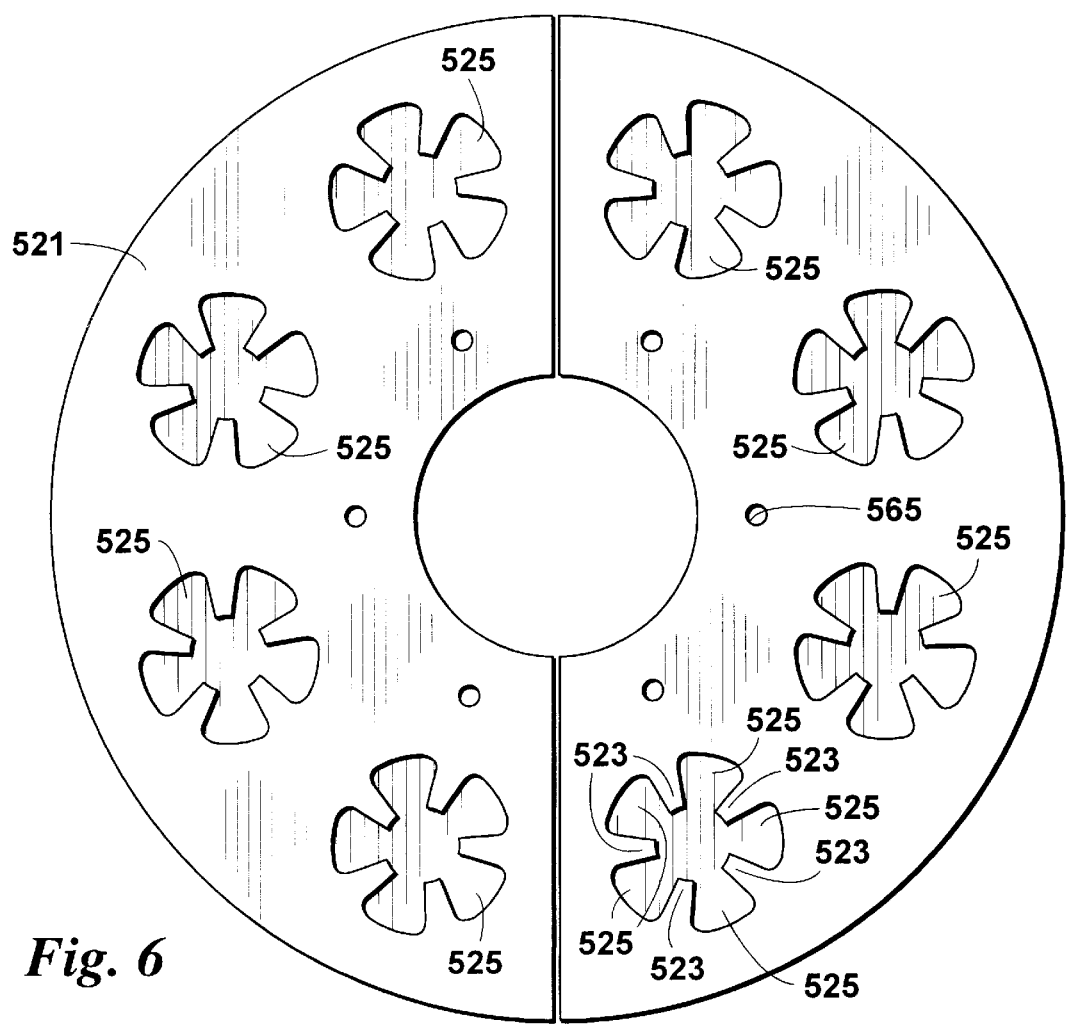
FIG. 6 is a top plan view of a rotating plate having eight petaloid-gripping nests.

As will be seen, particularly in FIG. 1, an arrangement of the fingers 23 within wells 25 has the finger 23 nearest the center of table 21 radially aligned with the table. Since there are an odd number of fingers, the two fingers most distant from the center of the table are equally spaced on either side of a radius of the table passing through the radially aligned finger opposite thereto. While this orientation is believed to be desirable in most instances, other orientations of the fingers (as shown in FIG. 6) could be employed, and in some cases might have advantages over the orientation shown in FIG. 1.

Figure 3:
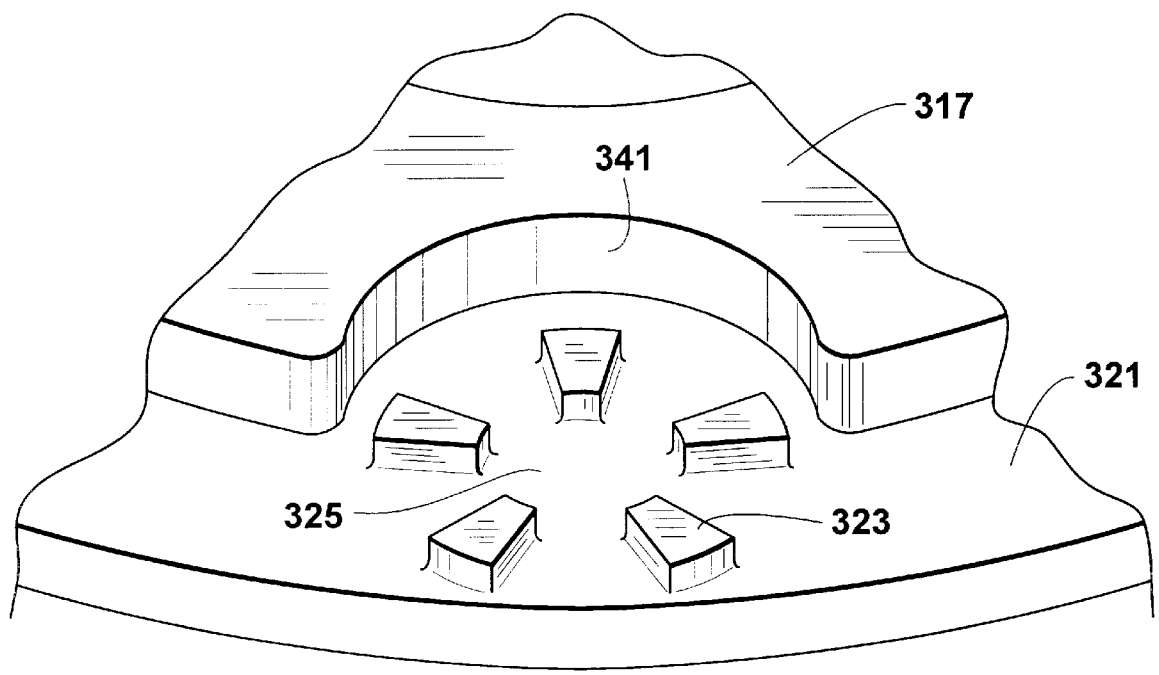
FIG. 3 shows a nest structure for an alternative embodiment of the invention having upstanding petaloid gripping fingers unitary with the machine table surface and extending above it.

In FIG. 3 an alternative form of nest and finger arrangement is shown. Only one segment of the structure of the table 321 is shown and it would be understood that the other segments would be identical. In FIG. 3 the fingers 323 are raised above the surface of table 321 and together with recess 341 form a nest 325 which is functionally very similar to the combination of nest 25 and fingers 23 in FIG. 1. In operation the fingers 323 and nest 325 arrangement of FIG. 3 would function somewhat differently than the arrangement previously described with respect to FIG. 1. In particular upon entering the capping machine bottle 27 would be lifted by fingers 323 bearing against the bulbous petals on the petaloid bottom of the bottle 27 before dropping down to the main level of table 321. As previously explained with reference to the apparatus of FIG. 1, the rotationally symmetrical shape and orientation of the fingers 323 could be modified to provide more ramping action of the bottle 27 entering the nest 325, but the symmetrical arrangement disclosed in FIG. 3 would be expected to provide quite satisfactory operation in ordinary circumstances.

Figure 4:
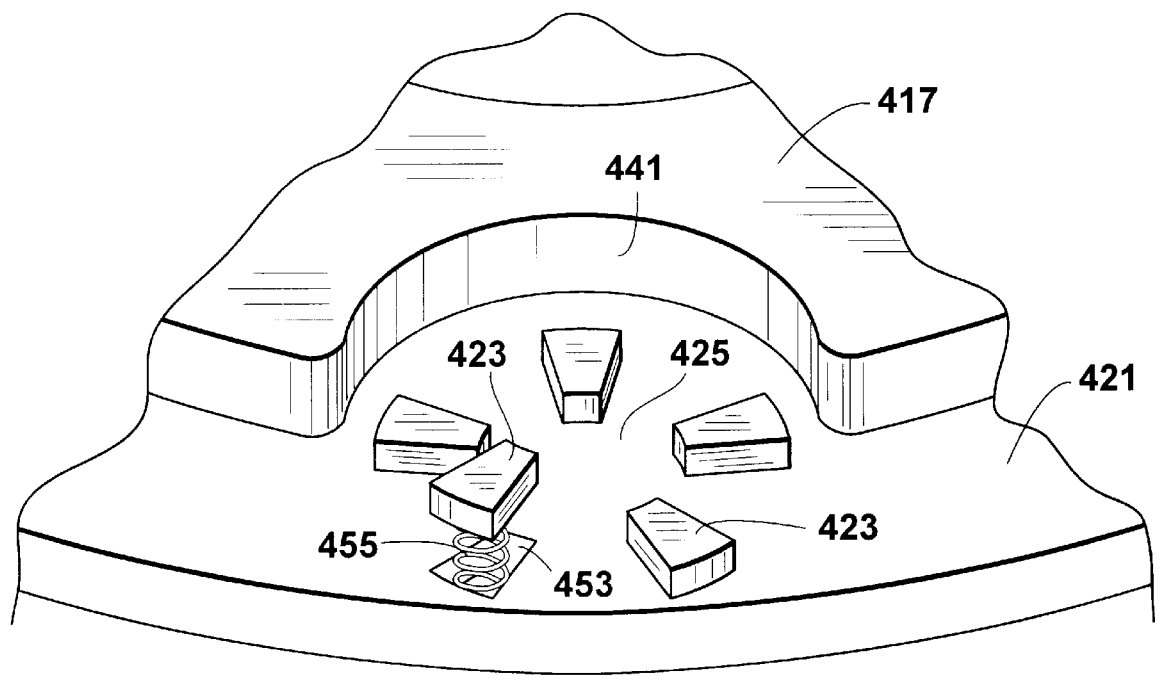
FIG. 4 shows a nest structure for another alternative embodiment of the invention utilizing upstanding fingers in the form of spring-loaded, depressible buttons.

In some circumstances, the facility with which bottles entered and left the nest 325 as illustrated in FIG. 3 may be improved by the arrangement of FIG. 4 showing resiliently mounted button-like fingers 423, one of which is shown in an exploded partially schematic view disclosing the resilient mounting therefor.

Each of the button-like fingers 423 is mounted in a cavity 453 in the surface of table 421. A spring 455 shown schematically urges the finger 423 upward and suitable means is provided (not shown) to act as a stop for upward movement of finger 423.

It will be understood that the fingers 423 and nest 425 of FIG. 4 provide a refinement wherein the lightly spring-loaded fingers 423 will tend to be depressed by the bottom of a bottle 27 thereby allowing the bottle to enter the nest 425 while being lifted only slightly, if at all. Once the bottle 27 is located against the recess 441 of guide 417, fingers 423 raise under the influence of springs 455 and thereupon function in a manner similar to fingers 323 of FIG. 3. While fingers 423 would be relatively easily individually depressed, all five fingers together would adequately resist depression under the influence of rotational torque on the bottle 29.

Figure 5:
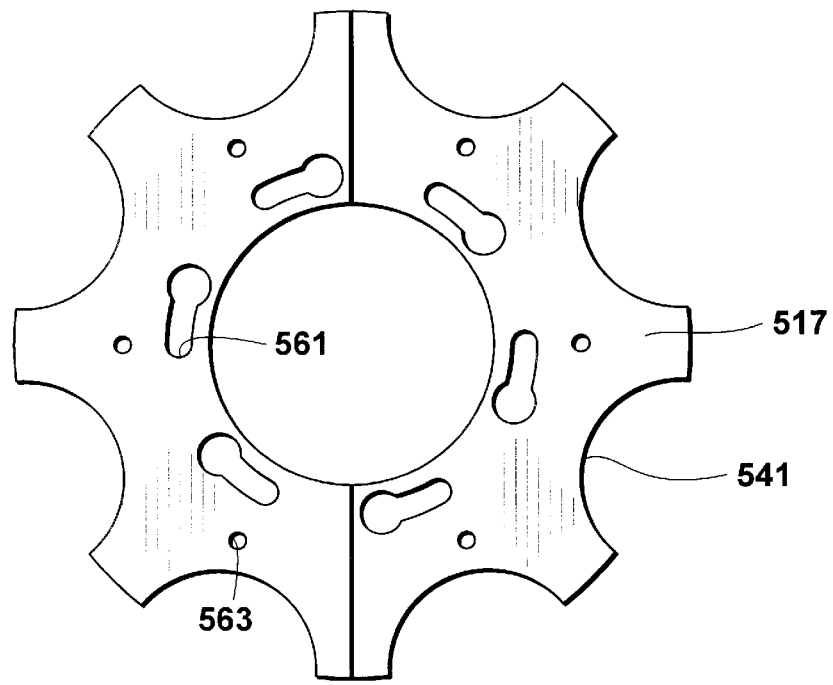
FIG. 5 is a top plan view of a rotating lower receiver having eight positions.

FIGS. 5 and 6 show apparatus for an eight station embodiment of the apparatus of the invention similar to the apparatus shown in FIG. 1. In FIG. 5, a rotating receiver 517 is shown having eight equally-spaced recesses 541 around the periphery thereof. The recesses 541 perform essentially the same function as the recesses 41 as described in reference to FIG. 1 and FIG. 2. Rotating receiver 517 is mounted in the capping machine by bolts or other suitable means cooperating with keyhole shaped mounting holes 561 or mounting holes 563.

FIG. 6 shows an eight station table 521 having eight equally spaced nests 525 provided with fingers 523 for gripping a bottle such as bottle 27. The function of the apparatus of FIG. 6, namely table 521, nests 525, and fingers 523, essentially correspond to the functions of table 21, nests 25, and fingers 23, all described with respect to FIG. 1. Suitable means such as mounting holes 565 are provided for securing table 521, which for convenience is formed in two sections, into the capping machine or filling and capping machine apparatus.

It should be noted that features or characteristics of any of the embodiments of FIGS. 1, 2, 3, 4, 5, or 6 may be combined with or substituted for those of other embodiments as may be found to be desirable. While the capping machine discussed as being modified in accordance with the present invention is one having a rotating table with twelve stations or eight stations, the invention would serve in substantially the same manner for capping machines having rotating tables with a greater number or a lesser number of stations, it being understood that there would be one set of petaloid bottle-engaging fingers for each station of the capping machine. In fact, the invention is adaptable to a capping machine without any rotating table at all as long as it has a rotating capping head and is employed with petaloid bottles, or bottles with a configuration other than a flat bottom which are engageable by fingers according to the invention as described above.

In addition to those variations and modifications to the apparatus according to the invention which are shown, described or suggested above, other variations and modifications will be apparent to those of skill in the art and, accordingly, the scope of the invention is not to be deemed to be limited to those variations and modifications shown or suggested.

What is claimed is:

1. In a capping machine adapted for capping plastic bottles with screw caps, said capping machine having a rotating table and a plurality of capping heads rotating with said table, apparatus to provide restraint for rotation of the bottle without any intrusive knives or pins for grasping the bottle comprising:

a bottle nest including a bottle supporting surface and at least three fingers stationary relative to the table and surface in a radial array positioned on said table under each capping head, at least the radially inward portions of said fingers rising upward between about one-eighth inch to about one-half inch above said bottle supporting surface; and rotating receivers including bottle receiving recesses respectively located at said capping heads at a level near the bottom of the bottles when resting on said bottle supporting surface;

whereby said receivers cause each bottle to assume a position substantially coaxial with the center of a respective one of said array of fingers to guide each bottle to drop into engagement with the fingers of a bottle nest, thereby restraining rotation of bottles during application of screw caps.

2. Apparatus as recited in claim 1 wherein said bottle nest includes a depression below the adjacent surface of a size large enough to receive the bottom of a bottle being capped.

3. Apparatus as recited in claim 1 wherein said at least three of fingers are five in number.

4. Apparatus as recited in claim 1 wherein said at least three of fingers are equal in number to the number of lobes on the bottom of bottles being capped.

5. Apparatus as recited in claim 1 wherein the surface at and around said nest is of uniform height and said fingers extend above said uniform height surface.

6. Apparatus as recited in claim 1 wherein said fingers have an elongated shape with a length about twice their width.

7. In a capping machine adapted for capping plastic bottles of petaloid shape with screw caps applied by capping heads, said capping machine having a rotating table and a plurality of capping stations provided with respective capping heads and rotating with said table, improved apparatus to provide restraint for rotation of the bottle by means for engaging the petaloid bottom of the bottle without any intrusive knives or pins for grasping the bottle comprising:

a bottle nest including a bottle supporting surface and a plurality of fingers stationary relative to the table and surface in a radial array positioned on said table at each capping machine station, said fingers having angular separations corresponding to the angular separations of the lobes of the petaloid bottles being capped, at least the radially inward portions of said fingers rising upward between about one-eighth inch to about one-half inch above said bottle supporting surface at the center of said array and above said bottle supporting surface equidistant between fingers of said array; and respective receivers including arcuate recesses located at said capping stations at a level near the bottom of the bottles when resting on said table;

whereby said receivers cause each bottle to assume a position substantially coaxial with the center of a respective one of said array of fingers to guide each bottle to drop into engagement with the fingers of a bottle nest thereby restraining rotation of bottles during application of screw caps.

8. Apparatus as recited in claim 7 wherein said bottle nest includes a depression below the adjacent surface of said table of a size large enough to receive the bottom of a bottle being capped.

9. Apparatus as recited in claim 7 wherein said plurality of fingers is equal in number to the number of lobes on the bottom of bottles being capped.

10. Apparatus as recited in claim 7 wherein said fingers have an elongated shape with a length about twice their width.

11. Apparatus as recited in claim 7 wherein the table surface at and around said nest is of uniform height and said fingers extend above said uniform height surface.

12. In a capping machine adapted for capping plastic bottles of petaloid shape with screw caps applied by capping heads, said capping machine having a rotating table and a plurality of capping stations provided with respective capping heads and rotating with said table, improved apparatus to provide restraint for rotation of the bottle by means for engaging the petaloid bottom of the bottle without any intrusive knives or pins for grasping the bottle comprising:

a bottle nest including a bottle supporting surface and a plurality of fingers stationary relative to the table and surface in a radial array positioned on said table at each capping machine station, said fingers having angular separations corresponding to the angular separations of the lobes of the petaloid bottles being capped, at least the radially inward portions of said fingers rising between about one-eighth inch to about one-half inch above said bottle supporting surface at the center of said array and above said bottle supporting surface equidistant between fingers of said array;

respective lower receivers including arcuate recesses located at said capping stations at a level near the bottom of the bottles when resting on said table; and respective upper receivers including arcuate recesses located at said capping stations at a level above about one-half of the bottle height from said table;

whereby said receivers cause each bottle to assume a position substantially coaxial with the center of a respective one of said array of fingers to guide each bottle to drop into engagement with the fingers of a bottle nest thereby restraining rotation of bottles.

13. Apparatus as recited in claim 12 wherein said bottle nest includes a depression below the surface of said table of a size large enough to receive the bottom of a bottle being capped.

14. Apparatus as recited in claim 13 wherein said plurality of fingers is equal in number to the number of lobes on the bottom of bottles being capped.

15. Apparatus as recited in claim 14 wherein said fingers have an elongated shape with a length about twice their width.

16. Apparatus as recited in claim 13 wherein said plurality of fingers is five in number.

* * * * *